Jan. 10, 1939.  J. S. ABERCROMBIE  2,143,399

PUMP VALVE

Filed May 6, 1935

James S. Abercrombie
INVENTOR.

BY J. Vincent Martin and
John W. Poteet
ATTORNEYS.

Patented Jan. 10, 1939

2,143,399

UNITED STATES PATENT OFFICE 2,143,399

PUMP VALVE

James S. Abercrombie, Houston, Tex., assignor, by mesne assignments, to Abercrombie Pump Company, Houston, Tex., a corporation of Texas Application May 6, 1935, Serial No. 19,925

5 Claims. (Cl. 251—144)

This invention relates to valves and is especially useful in connection with pumps of the type shown and described in United States Patent to Stephens 1,832,259.

One of the objects of this invention is to construct a valve assembly so as to substantially avoid leakage. Valves have been provided in the past with replaceable valve seats sealed to their valve bodies by resilient packing washers and arranged so that fluid pressure above the valve would force the seat more firmly into sealing position. However, in such constructions, it has been found that each application of the fluid pressure compresses the packing means and that after each application of pressure the packing expands, causing an action, which may be termed "breathing", of the packing. Naturally, under these circumstances the packing is short-lived, the movement of the valve seat with respect to the valve body will likewise tend to cause these parts to wear out more quickly. It is, therefore, an object of this invention to eliminate this "breathing" action in valves of this type. It is a further object to eliminate this breathing action without doing away with the advantages of the resilient packings heretofore used. Other objects are to arrange the parts so that the valve seat will be sealed in the surrounding structure, so that it will be readily accessible from the exterior of the engine or device for purposes of replacement. Among other objects of the invention may be the utilization of materials which are substantially non-compressible and which will yield sufficiently to seal the replaceable valve seat to the body of the surrounding structure, to use a material which will not be subject to breathing, to use a material which is capable of very accurately sealing rough spots in the adjacent parts, the arrangement of the structure per se, the use of gaskets which are so shaped that fluid pressure in the pump as well as mechanical pressure from the sealing parts tend to drive the gaskets tighter.

Figure 1:
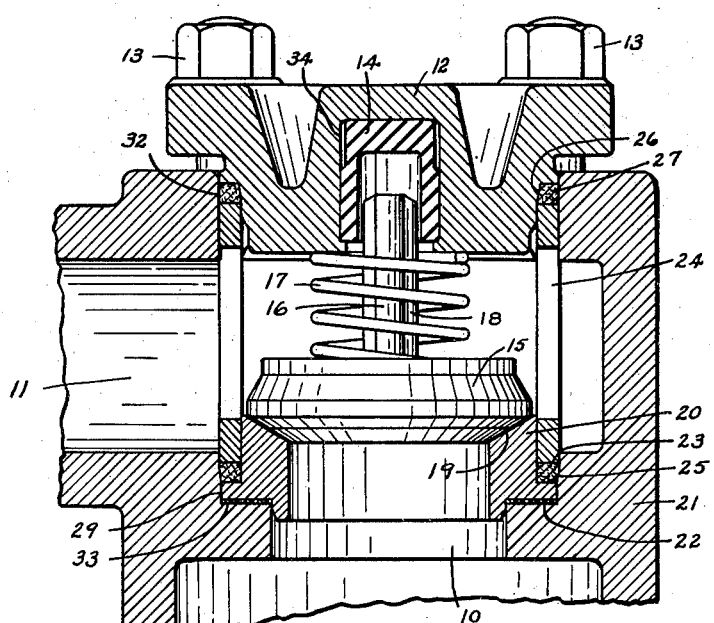
Figure 2:
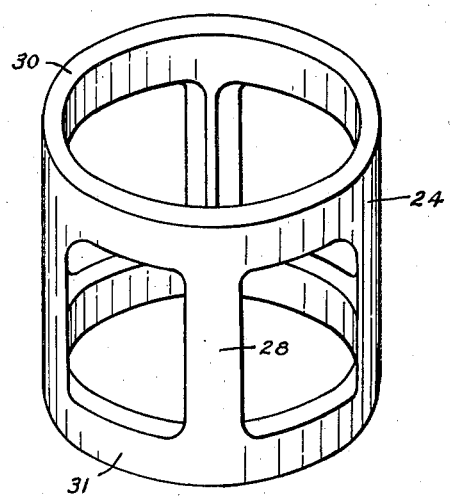

The invention will be better understood when considered in connection with the accompanying drawing, wherein Fig. 1 illustrates a transverse vertical section through one embodiment of the invention, and Fig. 2 illustrates the valve cage.

In the drawing a preferred embodiment of the invention has been illustrated. This, however, is not to be construed by way of limitation, but merely by way of illustration. The invention is shown as applied to a pump of the heretofore mentioned type comprising an engine or cylinder structure 21 having an inlet port 10 and an outlet port 11. The engine wall is counterbored at 29 to provide an annular shoulder 33 for a replaceable valve seat 20. The top of the engine is bored at 32 to receive a cover or cap 12.

Into this portion of the apparatus is assembled the component parts in their proper coordinated relation. On the annular shoulder 33 is positioned a gasket 22, which is preferably of lead or other similar material. This material should be such as to be substantially non-resilient and yet soft enough to seal any irregularities in the annular shoulder 33 or the correspondingly adjacent portion of the seat 20. The seat is then positioned upon the gasket. Another gasket 23 which is of yieldable material and may be termed a hydraulic gasket is positioned about the valve seat 20 between it and the walls of the counterbore. The counterbore 29 is tapered at 25 so that a wedging action will take place with respect to the hydraulic gasket.

The seat and its two gaskets are retained in position by a valve cage 24 which by way of illustration is shown as comprising two continuous annular portions 30 and 31 connected by a plurality of rods or bars 28. These rods or bars are shown as being substantially triangular in transverse section, although other constructions may be utilized. The lower annular part 31 of the cage seats directly on the cage gasket 23. The cap gasket 27 rests on the top of the cage. The valve 15 is positioned inside of the cage and is arranged to seat upon the tapered valve seat 19 comprising an upper annular portion of the replaceable valve seat member 20. The valve stem 16 is fluted as at 18 and projects upwardly into a downwardly extending bushing or rubber cup 14 carried in an opening 34 in the cap or cover 12. This cover is secured to the main structure 21 by a plurality of bolts 13. To maintain the valve on its seat a spring 17 is interposed between the main body of the valve 15 and the cap 12. The cap is suitably dimensioned so as to properly seat in the bore 32 and is tapered at 26 so that the cover gasket or cap gasket 27 which rides directly upon the top portion 30 of the cage can be forced downwardly by a wedging action.

It will thus be seen that the cap and the valve seat are sealed in the structure by gaskets 23 and 27 which are associated with tapered portions of the body 21 and the cap 12, respectively, thus causing a wedging action to take place upon these gaskets. The gaskets are directly interconnected by the means 24 comprising a valve cage as illustrated. The upper gasket 27 is acted upon by both direct force and angular forces coming from the tapered surface 26. The tapered arrangement of the cap is such as to act in a manner tending to increase the annular extent of the gasket 27, whereas the taper 25 is such as to tend to decrease the annular extent of the gasket 23. The structure readily operates in a manner whereby the mechanical pressure exerted by the cage tends to seal the gaskets in place, and fluid pressure inside the pump in the counterbore portion 29 will also act to seal both gaskets but will cause no movement of the valve seat or "breathing" such as hereinbefore referred to.

In the claims of this application I have used the term valve body with reference to the housing of the assembly shown in the drawing. This term is to be taken in a generic sense and not to be limited specifically to a valve body per se, but is intended to include the parts of the pumps and/or engines and/or compressors and/or any other structure in which the invention herein shown and described is utilized.

Although a particular embodiment of the invention has been illustrated and described, variations within the true spirit and scope of the invention are intended to be covered by the hereto appended claims.

I claim:

1. In combination, a valve body, a replaceable valve seat; relatively non-resilient deformable means sealing the seat in the body; a cover; means to seal the cover to the body; yieldable means to additionally seal the seat to the body; and means directly interconnecting said last two sealing means.

2. In combination, a valve body, a replaceable valve seat; a cover; means to seal the cover to the body; means to seal the seat to the body; and means directly interconnecting said sealing means exclusive of said seat, said first sealing means including a downwardly tapering portion on the cover and the second a downwardly tapering portion on the body.

3. The combination in a valve of a valve body; a flanged inlet portion; a replaceable seat arranged to seat on said flanged portion; relatively yieldable and non-compressible means to seal said seat to said flanged body portion; a cover for said body; a resilient element; a valve yieldably held on said seat by said resilient element; wedge shaped sealing means between the body and both the seat and cover; and a cage interconnecting said wedge shaped means.

4. In combination, a valve body, a replaceable valve seat, a cover, one of said parts having an externally conical member, and another a conical socket, means to seal the cover to the body, means to seal the seat to the body, and means exclusive of said cover and said seat directly interconnecting said sealing means and acting on one of said sealing means tending to force it over said externally conical member to increase its inner periphery, and on the other tending to force it into said conical socket to decrease its outer periphery.

5. The combination of a valve body, a replaceable valve seat adapted to be urged by fluid pressure into sealing engagement with said valve body, relatively incompressible packing means between said seat and said body to form a relatively non-yielding support for said seat against said body, whereby varying fluid pressures against said seat will not cause relative movement between said seat and said body, yieldable packing means, and means for forcing said last mentioned packing means into sealing engagement with said seat and said body independently of any relative movement between said seat and body.

JAMES S. ABERCROMBIE.